(12) United States Patent
Chiang et al.

(10) Patent No.: US 12,353,710 B2
(45) Date of Patent: Jul. 8, 2025

(54) BODY-WORN CAMERA AND OPERATION METHOD THEREOF

(71) Applicant: GETAC TECHNOLOGY CORPORATION, New Taipei (TW)

(72) Inventors: Hsien-Yang Chiang, Taipei (TW);
Ta-Wei Chang, Taipei (TW);
Cheng-Liang Huang, Taipei (TW);
Yeh-Sheng Chen, Taipei (TW)

(73) Assignee: Getac Technology Corporation, New Taipei (TW)

( * ) Notice: Subject to any disclaimer, the term of this patent is extended or adjusted under 35 U.S.C. 154(b) by 183 days.

(21) Appl. No.: 18/350,707

(22) Filed: Jul. 11, 2023

(65) Prior Publication Data

US 2024/0155082 A1    May 9, 2024

Related U.S. Application Data

(60) Provisional application No. 63/449,272, filed on Mar. 1, 2023, provisional application No. 63/423,453, filed on Nov. 7, 2022.

(51) Int. Cl.
*G06V 20/52* (2022.01)
*G06F 1/16* (2006.01)
(Continued)

(52) U.S. Cl.
CPC .......... *G06F 3/0604* (2013.01); *G06F 3/0655* (2013.01); *G06F 3/0676* (2013.01);
(Continued)

(58) Field of Classification Search
CPC ........ G06V 20/52; G06F 1/1686; G06F 1/163
See application file for complete search history.

(56) References Cited

U.S. PATENT DOCUMENTS 6,563,532 B1 * 5/2003 Strub .................. G11B 27/031
348/376
9,019,431 B2 * 4/2015 Phillips ............... G03B 17/566
348/375
(Continued)

FOREIGN PATENT DOCUMENTS

CN     110858493 A     3/2020
CN     113407486 A     9/2021
(Continued)

OTHER PUBLICATIONS

European Search Report issued on Jan. 5, 2024 for EP application No. 23189417.1, 7 pages.

*Primary Examiner* — Frank Johnson
(74) *Attorney, Agent, or Firm* — Cooper Legal Group, LLC

(57) ABSTRACT

A body-worn camera and an operation method thereof are provided, and the body-worn camera a central processing unit, a video recording module, a turntable, and a main button. The video recording module is electrically connected to the central processing unit. The turntable is electrically connected to the central processing unit. The main button is electrically connected to the central processing unit. After the video recording module completes recording a video, when the central processing unit receives a category mode signal from the turntable and receives a category name confirmation signal from the main button, the central processing unit executes a video tagging program, and the video tagging program saves a corresponding relationship between a category name and the video.

10 Claims, 8 Drawing Sheets

(51) Int. Cl.
  *G06F 3/06* (2006.01)
  *G08B 13/196* (2006.01)
  *G10L 15/22* (2006.01)
  *G10L 21/034* (2013.01)
  *G10L 21/0364* (2013.01)
  *G10L 25/78* (2013.01)
  *H01H 9/16* (2006.01)
  *H04N 7/18* (2006.01)

(52) U.S. Cl.
  CPC ..... *G06F 3/0679* (2013.01); *G08B 13/19621* (2013.01); *G10L 15/22* (2013.01); *G10L 21/034* (2013.01); *G10L 21/0364* (2013.01); *G10L 25/78* (2013.01); *H01H 9/161* (2013.01); *H04N 7/185* (2013.01); *G10L 2025/786* (2013.01)

(56) References Cited

U.S. PATENT DOCUMENTS

| | | | |
|---|---|---|---|
| 10,446,183 | B2 | 10/2019 | Smith et al. |
| 11,950,017 | B2* | 4/2024 | Han ................ H04N 7/188 |
| 2004/0212637 | A1 | 10/2004 | Varghese |
| 2005/0147397 | A1* | 7/2005 | Isawa ................ G11B 31/006 |
| 2016/0196693 | A1 | 7/2016 | Kobayashi et al. |
| 2016/0227173 | A1 | 8/2016 | Yamaguchi et al. |
| 2022/0036131 | A1 | 2/2022 | Chang |
| 2022/0321763 | A1* | 10/2022 | Burton ................ G03B 29/00 |

FOREIGN PATENT DOCUMENTS

| | | |
|---|---|---|
| TW | 200420120 A | 10/2004 |
| TW | 200614818 A | 5/2006 |
| TW | 202205143 A | 2/2022 |

* cited by examiner

BODY-WORN CAMERA AND OPERATION METHOD THEREOF

CROSS-REFERENCE TO RELATED PATENT APPLICATION

This application claims the benefit of priorities to U.S. Provisional Patent Application Ser. No. 63/423,453, filed on Nov. 7, 2022, and Ser. No. 63/449,672, filed on Mar. 1, 2023, which applications are incorporated herein by reference in their entireties.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a video recording device and an operation method thereof, and more particularly to a body-worn camera and an operation method thereof.

BACKGROUND OF THE DISCLOSURE

At present, when a police officer is on duty, in order to collect evidence and maintain his own safety, he uses a body-worn camera to record a scene of an incident. When the police officer returns to a police station after completing a task, the police officer connects the body-worn camera to a server in the police station. The police officer then identifies a content of each of recorded videos, and tags each of the recorded videos with a category name through the server. For example, if the content of a video is about a traffic accident, the police officer tags a traffic incident tag on the video through the server.

However, if the police officer has recorded a large number of videos as a result of a heavy workload, after the police officer completes his duties and returns to the police station, he needs to spend a lot of time tagging the category names for the videos, which is very time-consuming.

SUMMARY OF THE DISCLOSURE

In response to the above-referenced technical inadequacies, the present disclosure provides a body-worn camera and an operation method thereof.

In one aspect the present disclosure provides a body-worn camera. The body-worn camera includes a central processing unit, a video recording module, a turntable, and a main button. The video recording module is electrically connected to the central processing unit. The turntable is electrically connected to the central processing unit. The main button is electrically connected to the central processing unit. After the video recording module completes recording a video, when the central processing unit receives a category mode signal from the turntable and receives a category name confirmation signal from the main button, the central processing unit executes a video tagging program, and the video tagging program saves a corresponding relationship between a category name and the video.

In another aspect, the present disclosure provides an operation method of a body-worn camera. The operation method includes: receiving a video recording trigger signal to instruct a video recording module of the body-worn camera to start recording a video; receiving a stop recording signal to instruct the video recording module to stop recording and to complete recording the video; receiving a category mode signal from a turntable of the body-worn camera; receiving a category name confirmation signal from a main button of the body-worn camera; and executing a video tagging program of the body-worn camera, so as to save a corresponding relationship between a category name and the video.

Therefore, in the body-worn camera and the operation method thereof provided by the present disclosure, when a police officer finishes using the body-worn camera to record a video relevant to a scene of accident, the police officer may immediately use the body-worn camera to save the corresponding relationship between a category name and the video. In this way, when the police officer returns to a police station after completing his duty, the police officer does not need to spend time using a server to tag the category name for the video, which saves a lot of time and improves efficiency for an on-duty police officer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
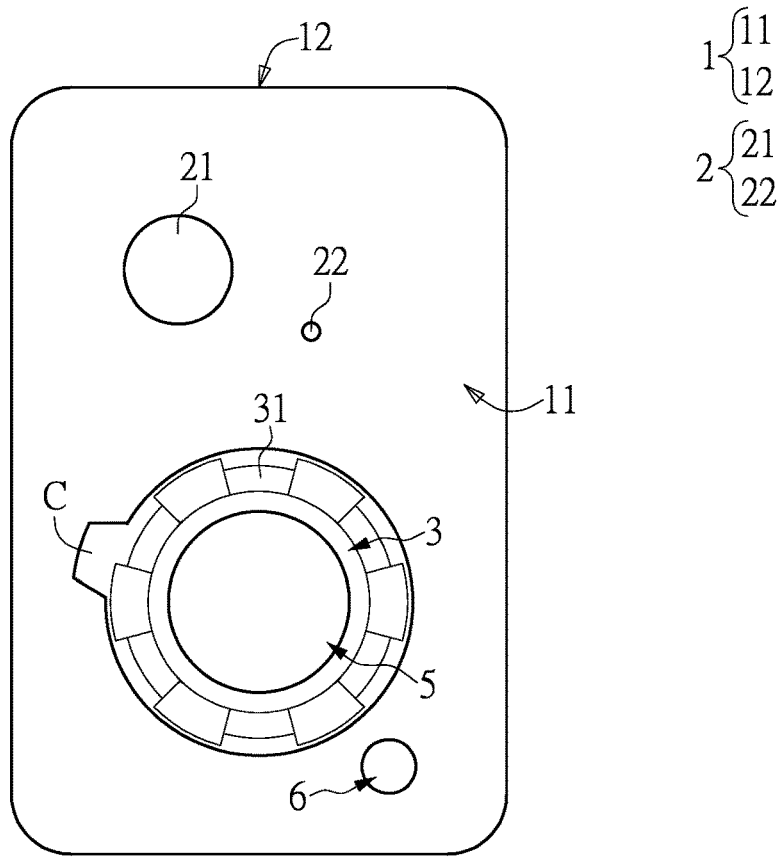
FIG. 1 is a schematic diagram of a body-worn camera according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles may be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like. In addition, the term "connect" in the context of the present disclosure means that there is a physical connection between two elements, and the two elements are directly or indirectly connected.

Figure 2:
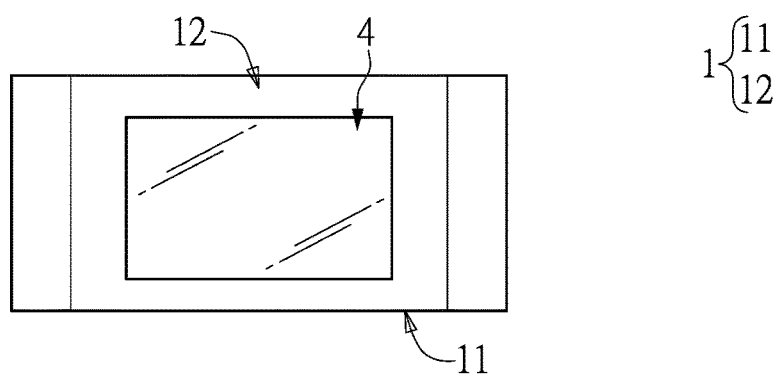
FIG. 2 is a schematic diagram of the body-worn camera of FIG. 1 taken in another angle of view.

FIG. 1 is a schematic diagram of a body-worn camera according to one embodiment of the present disclosure. FIG. 2 is a schematic diagram of the body-worn camera of FIG. 1 taken in another angle of view. Referring to FIG. 1 and FIG. 2, the body-worn camera includes, for example, a casing 1, a video recording module 2, a turntable 3, a displayer 4, a main button 5, and an auxiliary button 6, but the present disclosure is not limited thereto. The video recording module 2 includes, for example, a photographic lens 21 and a microphone 22. The photographic lens 21, the microphone 22, the turntable 3, the main button 5, and the auxiliary button 6 are arranged on a first side 11 of the casing 1, the displayer 4 is arranged on a second side 12 of the casing 1, and the second side 12 is adjacent to the first side 11.

The turntable 3 includes a plurality of operating portions 31 spaced apart from each other and surround the main button 5, and any two adjacent ones of the plurality of operating portions 31 have a same included angle therebetween. In this embodiment, the operation portions 31 are grooves, but the present disclosure is not limited thereto. The operation portions 31 may also be protrusions or other structures that allow a user to conveniently operate the turntable 3. The casing 1 also has a positioning structure (that is not shown in FIG. 3) provided thereon. The positioning structure is provided to fix the position of the turntable 3. If a user wants to rotate the turntable 3, he may exert a force on the turntable 3 to overcome a resistance provided by the positioning structure. The positioning structure includes, for example, a plurality of positioning grooves and a plurality of elastic elements corresponding to the operating portions 31, but the present disclosure is not limited thereto.

Figure 3:
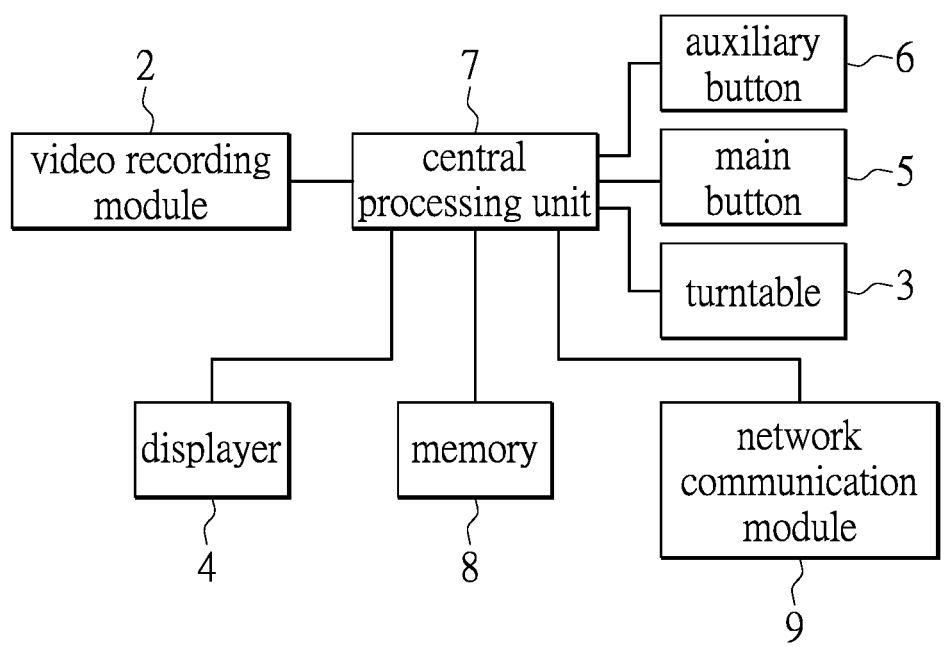
FIG. 3 is a functional block diagram of the body-worn camera according to a first embodiment of the present disclosure.

FIG. 3 is a functional block diagram of the body-worn camera according to a first embodiment of the present disclosure. Referring to FIG. 3, in addition to the video recording module 2, the turntable 3, the displayer 4, the main button 5, and the auxiliary button 6, the body-worn camera further includes a central processing unit 7, a memory 8, and a network communication module 9. The central processing unit 7, the memory 8, and the network communication module 9 are arranged on a circuit board inside the casing 1. The video recording module 2, the turntable 3, the displayer 4, the main button 5, the auxiliary button 6, the memory 8, and the network communication module 9 are electrically connected to the central processing unit 7, the memory 8 includes a random-access memory (RAM) and a flash memory, and the body-worn camera may communicate with a remote device by using the network communication module 9.

The body-worn camera is generally in a pre-recording mode or a privacy mode. Specifically, when the body-worn camera is in the pre-recording mode and the central processing unit 7 does not receive a video recording trigger signal, the video recording module 2 continuously records a video. Conversely, when the body-worn camera is in the privacy mode and the central processing unit 7 does not receive the video recording trigger signal, the video recording module 2 does not record a video.

When the body-worn camera is in the pre-recording mode and the auxiliary button 6 is triggered, the central processing unit 7 receives a mode switching signal from the auxiliary button 6, so that the body-worn camera switches from the pre-recording mode to the privacy mode. Conversely, when the body-worn camera is in the privacy mode and the auxiliary button 6 is triggered, the central processing unit 7 receives the mode switching signal from the auxiliary button 6, so that the body-worn camera is switched from the privacy mode to the pre-recording mode. The auxiliary button 6 can be triggered by, for example, being pressed once or being continuously pressed for several seconds, but the present disclosure is not limited thereto.

When the central processing unit 7 of the body-worn camera in the pre-recording mode or the privacy mode receives a video recording trigger signal, the central processing unit 7 instructs the video recording module 2 to start recording. At this time, the body-worn camera is switched from the pre-recording mode to a video recording mode. When the video recording mode of the body-worn camera continues for a period of time and the central processing unit 7 of the body-worn camera receives a stop recording signal, the central processing unit 7 instructs the video recording module 2 to stop recording and to save a recorded video into the memory 8. At this time, the body-worn camera is switched from the video recording mode to a category mode.

A plurality of different category names (not shown in the figures) are saved in the memory 8, and these category names include, for example, a robbery incident, a traffic incident, a speeding incident, a drunk driving incident, a fighting incident, and a homicide incident, but the present disclosure is not limited thereto.

For example, when the body-worn camera is in the category mode and a user rotates one of the operating portions 31 of the turntable 3 by a first angle in the clockwise direction, the turntable 3 is triggered and the central processing unit 7 receives a category mode signal from the turntable 3 such that the central processing unit 7 drives the displayer 4 to display a first category name (such as a robbery incident). When the user rotates the operating portion 31 of the turntable 3 by a second angle that can be twice the first angle in the clockwise direction, the central processing unit 7 receives the category mode signal from the turntable 3 and the central processing unit 7 drives the displayer 4 to display a second category name (such as a traffic incident). That is, when the turntable 3 is rotated by different angles, the displayer 4 displays different category names. When the displayer 4 displays the second category name and the turntable 3 is rotated in a counterclockwise direction, the displayer 4 displays the first category name.

When the displayer 4 displays the category name and the main button 5 is triggered, the central processing unit 7 receives a category name confirmation signal from the main button 5. The main button 5 can be triggered by, for example, being pressed once or being continuously pressed for several seconds, but the present disclosure is not limited thereto.

After the central processing unit 7 receives the category name confirmation signal, the central processing unit 7 executes a video tagging program (not shown in the figures) saved in the memory 8, and the video tagging program saves a corresponding relationship between the category name and the video.

Figure 4:
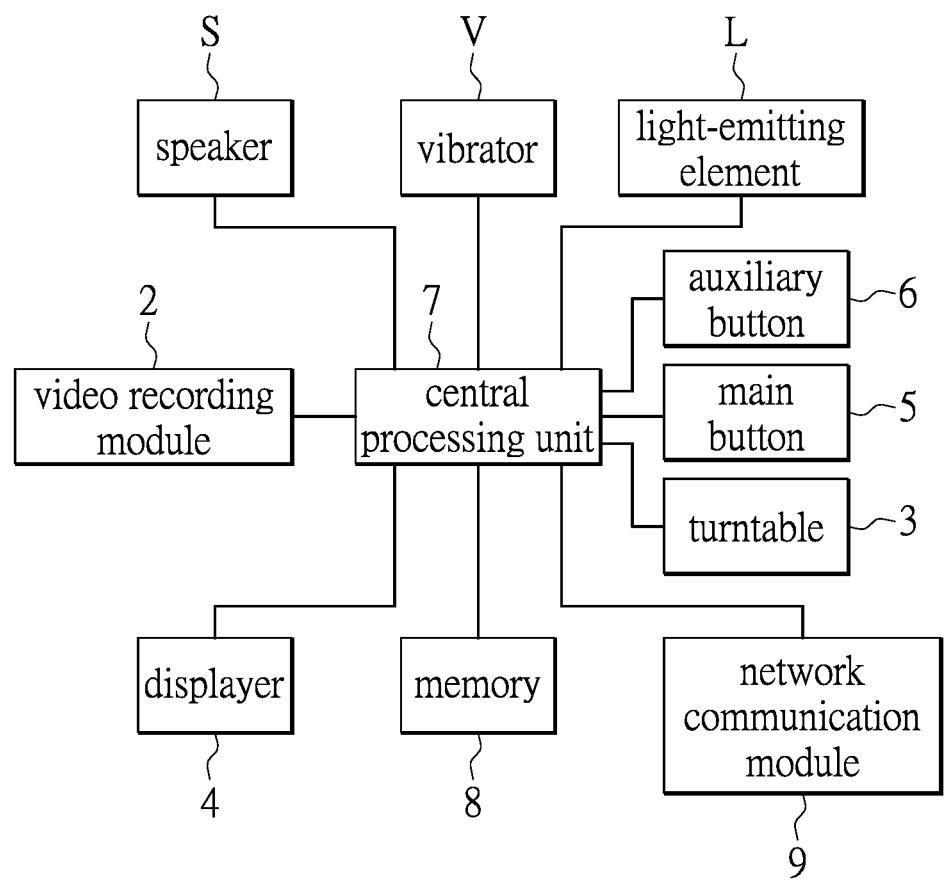
FIG. 4 is a functional block diagram of the body-worn camera according to a second embodiment of the present disclosure.

FIG. 4 is a functional block diagram of the body-worn camera according to a second embodiment of the present disclosure. Compared with the body-worn camera of FIG. 1, the body-worn camera of FIG. 4 further includes a speaker S, a vibrator V, and a light-emitting element L (such as a light-emitting diode), and the speaker S, the vibrator V, and the light-emitting element L are electrically connected to the central processing unit 7. When the displayer 4 displays the category name, the central processing unit 7 drives the speaker S to output a prompt sound relevant to the category name, drives the vibrator V to generate vibrations, or drives the light-emitting element L to emit light, or any combination of driving the speaker S to output a prompt sound relevant to the category name, driving the vibrator V to generate vibrations, or driving the light-emitting element L to emit light.

When the central processing unit 7 receives the category name confirmation signal from the main button 5, the central processing unit 7 drives the speaker S to output a prompt sound relevant to confirmation of the category name, or drives the vibrator V to generate vibrations, or drives the light-emitting element L to emit light, or any combination of the prompt sound, the vibrations, and the light.

After the displayer 4 displays the category name, when the main button 5 is not triggered within a preset idle time, the central processing unit 7 drives the speaker S to output a prompt sound indicating a protracted idle time, or drives the vibrator V to generate vibrations, or drives the light-emitting element L to emit light, or any combination of the prompt sound, the vibrations and the light.

In other embodiments, the displayer 4 of the body-worn camera may be omitted, or the body-worn camera includes any one or any two of the speaker S, the vibrator V, and the light-emitting element L.

Referring to FIG. 1 and FIG. 4, a covert mode knob C is further provided on the casing 1 of the body-worn camera and the covert mode knob C is located outside the turntable 3. The covert mode knob C includes three stages of switching. When the covert mode knob C is in a first stage, the speaker S, the vibrator V, the light-emitting element L, and the displayer 4 are disabled. When the covert mode knob C is in a second stage, the speaker S and the light-emitting element L are disabled, and the displayer 4 and the vibrator V are enabled. When the covert mode knob C is in a third stage, the speaker S, the light-emitting element L, the displayer 4, and the vibrator V are enabled.

Figure 5:
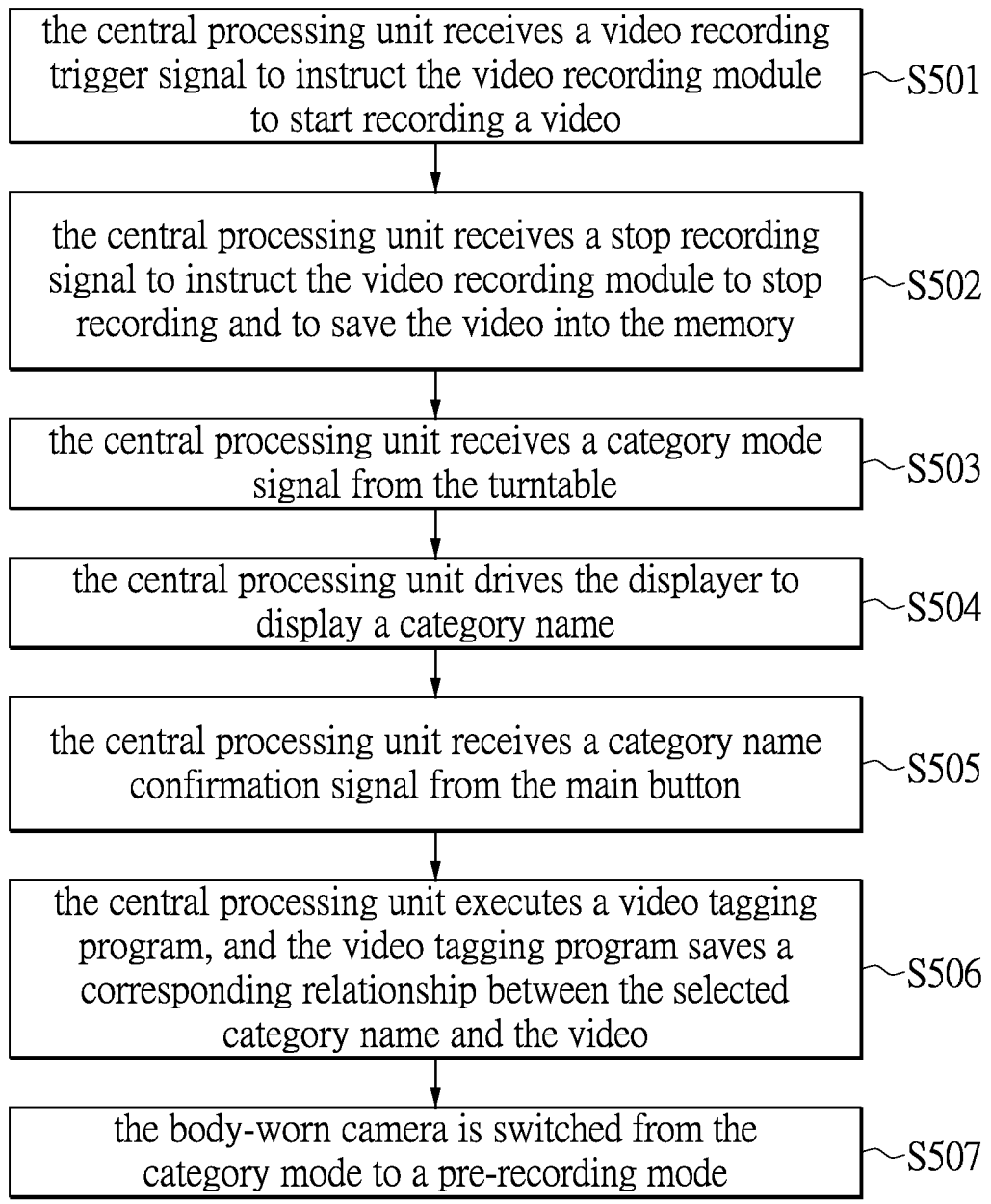
FIG. 5 is a flowchart of an operation method of the body-worn camera according to a first embodiment of the present disclosure.

FIG. 5 is a flowchart of an operation method of the body-worn camera according to a first embodiment of the present disclosure. Referring to FIG. 5, in step S501, the central processing unit 7 receives a video recording trigger signal to instruct the video recording module 2 to start recording a video. At this time, the body-worn camera enters a video recording mode. For example, when the main button 5 is pressed once, the main button 5 sends a video recording trigger signal to the central processing unit 7. In addition, the body-worn camera may also receive the video recording trigger signal from a remote device through the network communication module 9.

In step S502, the central processing unit 7 receives a stop recording signal to instruct the video recording module 2 to stop recording and to save the video into the memory 8. At this time, the body-worn camera is switched from the video recording mode to a category mode. For example, when the main button 5 is continuously pressed for a period of time, the main button 5 sends a stop recording signal to the central processing unit 7. Similarly, the body-worn camera may also receive the stop recording signal from the remote device through the network communication module 9.

In step S503, the central processing unit 7 receives a category mode signal from the turntable 3. For example, when the turntable 3 is rotated in a clockwise direction or a counterclockwise direction, the turntable 3 sends the category mode signal to the central processing unit 7.

In step S504, the central processing unit 7 drives the displayer 4 to display a category name.

In step S505, the central processing unit 7 receives a category name confirmation signal from the main button 5, so as to confirm the category name selected by a user. For example, when the displayer 4 displays a speeding incident and the main button 5 is pressed by a user, the central processing unit 7 confirms that the category name is the speeding incident.

In step S506, the central processing unit 7 executes a video tagging program, and the video tagging program saves a corresponding relationship between the selected category name and the video. For example, when the central processing unit 7 confirms that the selected category name is a drunk driving incident, the central processing unit 7 executes the video tagging program saved in the memory 8, and the video tagging program tags the video as the drunk driving incident.

In step S507, the body-worn camera is switched from the category mode to a pre-recording mode.

Figure 6:
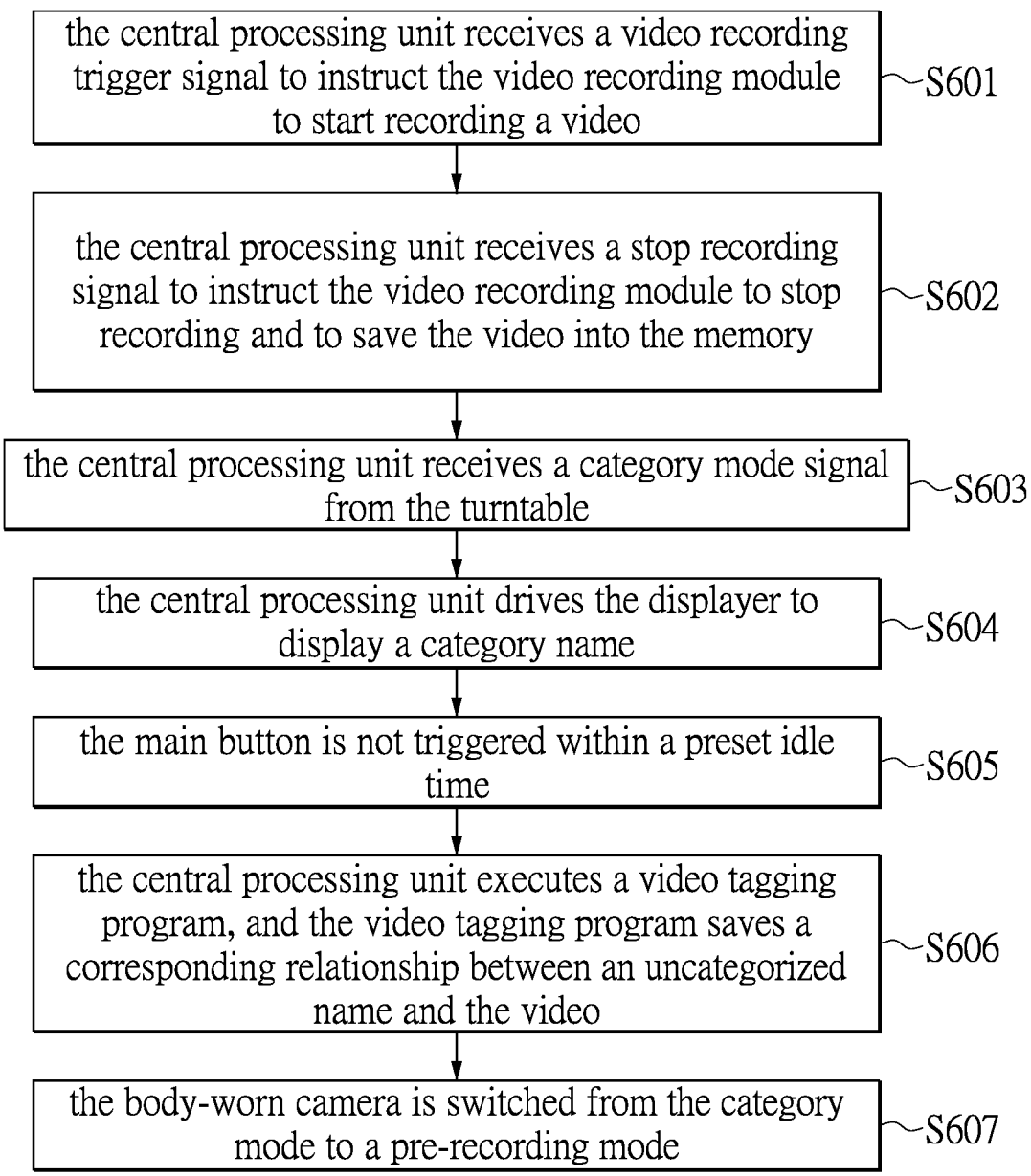
FIG. 6 is a flowchart of the operation method of the body-worn camera according to a second embodiment of the present disclosure.

FIG. 6 is a flowchart of the operation method of the body-worn camera according to a second embodiment of the present disclosure. Referring to FIG. 6, in step S601, the central processing unit 7 receives a video recording trigger signal to instruct the video recording module 2 to start recording a video. At this time, the body-worn camera enters a video recording mode.

In step S602, the central processing unit 7 receives a stop recording signal to instruct the video recording module 2 to stop recording and to save the video into the memory 8. At this time, the body-worn camera is switched from the video recording mode to a category mode.

In step S603, the central processing unit 7 receives a category mode signal from the turntable 3.

In step S604, the central processing unit 7 drives the displayer 4 to display a category name.

In step S605, the main button 5 is not triggered within a preset idle time.

In step S606, the central processing unit 7 executes a video tagging program, and the video tagging program saves a corresponding relationship between an uncategorized name and the video.

In step S607, the body-worn camera is switched from the category mode to a pre-recording mode.

For example, a default idle time is ten seconds, if the main button 5 is not pressed within ten seconds after the displayer 4 displays a speeding incident, the video tagging program saves a corresponding relationship between an uncategorized name and the video. Subsequently, the body-worn camera is switched from the category mode to the pre-recording mode. Furthermore, each time when the turntable 3 is rotated, the idle time is restarted.

Figure 7:
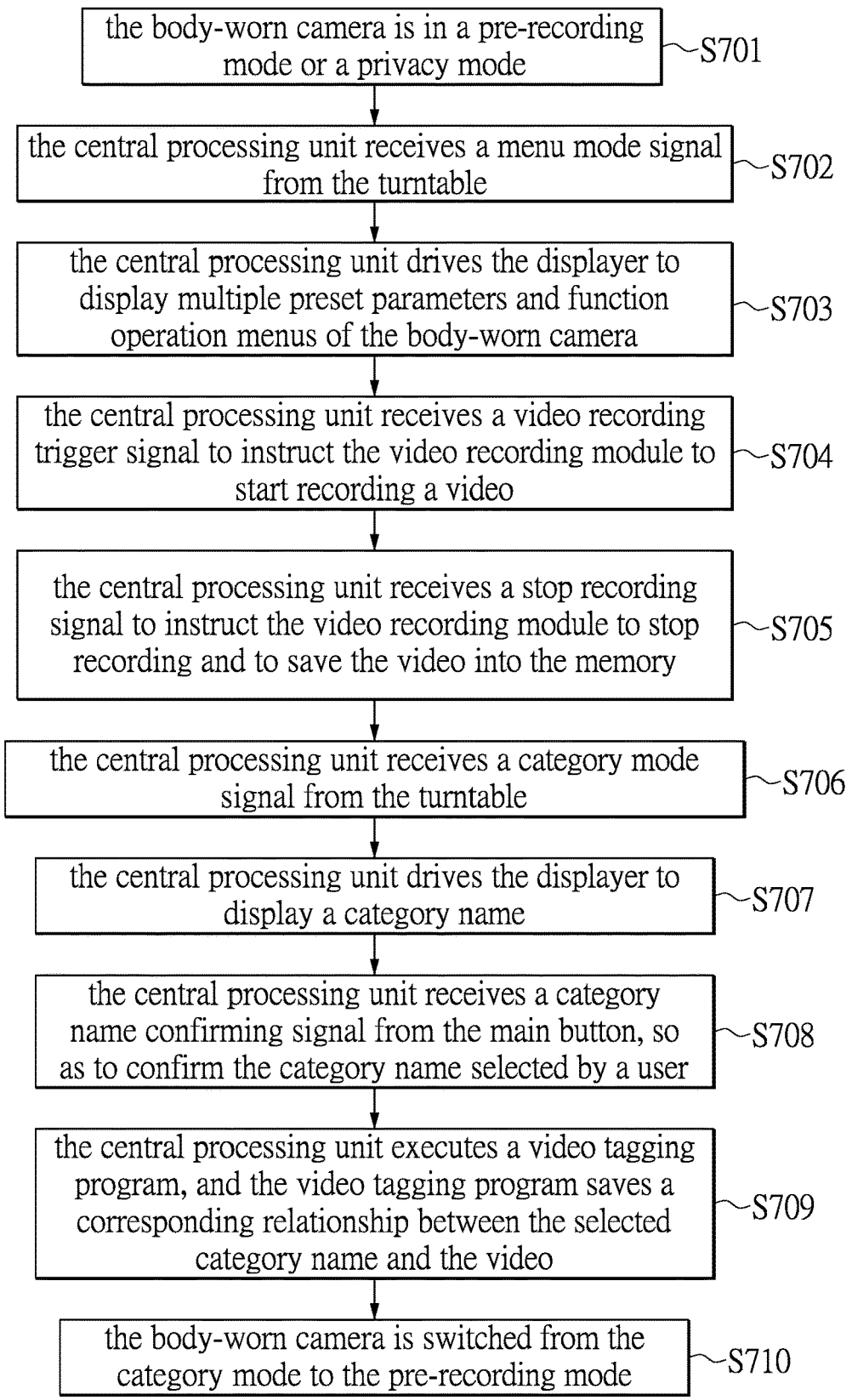
FIG. 7 is a flowchart of the operation method of the body-worn camera according to a third embodiment of the present disclosure.

FIG. 7 is a flowchart of the operation method of the body-worn camera according to a third embodiment of the present disclosure. Referring to FIG. 7, in step S701, the body-worn camera is in a pre-recording mode or a privacy mode. In step S702, the central processing unit 7 receives a menu mode signal from the turntable 3. Specifically, when the body-worn camera is in the pre-recording mode or the privacy mode, and the turntable 3 is rotated along a clockwise direction or a counterclockwise direction, the turntable 3 sends a menu mode signal to the central processing unit 7. At this time, the body-worn camera is switched from the pre-recording mode or the privacy mode to a menu mode.

In step S703, the central processing unit 7 drives the displayer 4 to display multiple preset parameters and function operation menus of the body-worn camera. These preset parameters include, for example, a speaker volume, a user name, a software version, a remaining space, resolution, transparency, a video storage format, a photo sensor name, a lens focal length, and a denoising level, but the present disclosure is not limited thereto.

In step S704, the central processing unit 7 receives a video recording trigger signal to instruct the video recording module 2 to start recording a video. At this time, the body-worn camera is switched from the menu mode to the recording mode. For example, when the body-worn camera is in the menu mode and the main button 5 is pressed, the main button 5 sends a video recording trigger signal to the central processing unit 7. When the central processing unit 7 reads the video recording trigger signal, the body-worn camera is switched from the menu mode to the video recording mode, and the central processing unit 7 instructs the video recording module 2 to start recording the video.

In step S705, the central processing unit 7 receives a stop recording signal to instruct the video recording module 2 to stop recording and to save the video into the memory 8.

In step S706, the central processing unit 7 receives a category mode signal from the turntable 3.

In step S707, the central processing unit 7 drives the displayer 4 to display a category name.

In step S708, the central processing unit 7 receives a category name confirming signal from the main button 5, so as to confirm the category name selected by a user.

In step S709, the central processing unit 7 executes a video tagging program, and the video tagging program saves a corresponding relationship between the selected category name and the video.

In step S710, the body-worn camera is switched from the category mode to the pre-recording mode.

Figure 8:
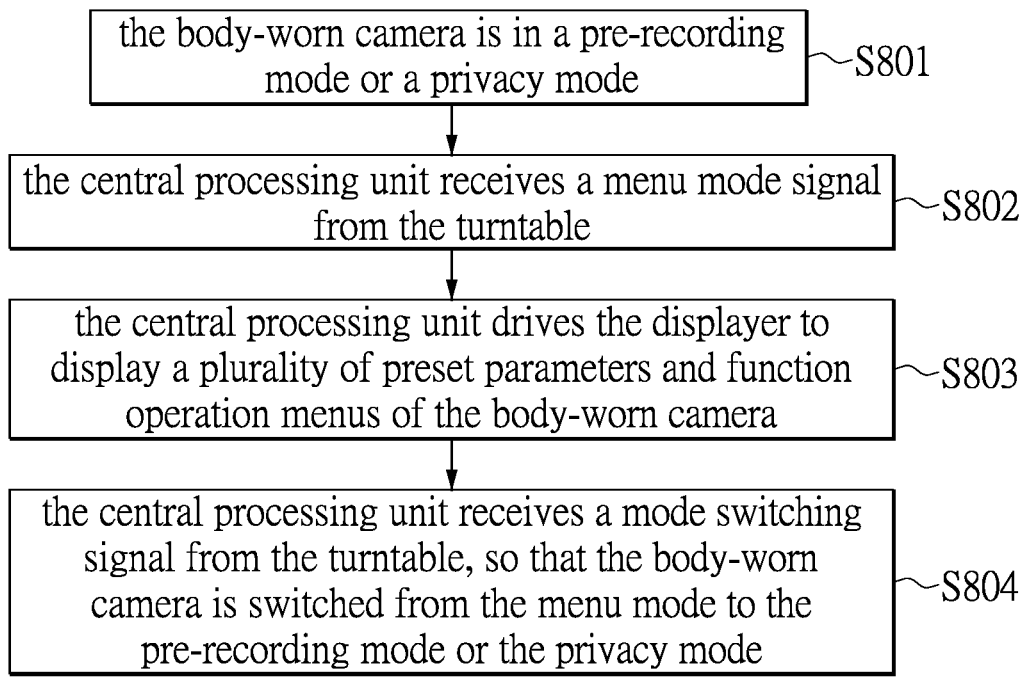
FIG. 8 is a flowchart of the operation method of the body-worn camera according to a fourth embodiment of the present disclosure.

FIG. 8 is a flowchart of the operation method of the body-worn camera according to a fourth embodiment of the present disclosure. Referring to FIG. 8, in step S801, the body-worn camera is in a pre-recording mode or a privacy mode. In step S802, the central processing unit 7 receives a menu mode signal from the turntable 3. At this time, the body-worn camera is switched from the pre-recording mode or the privacy mode to the menu mode.

In step S803, the central processing unit 7 drives the displayer 4 to display a plurality of preset parameters and function operation menus of the body-worn camera.

In step S804, the central processing unit 7 receives a mode switching signal from the turntable 3, so that the body-worn camera is switched from the menu mode to the pre-recording mode or the privacy mode. Specifically, after the body-worn camera is switched from the pre-recording mode to the menu mode, the body-worn camera may return to the pre-recording mode by the operation of the turntable 3. After the body-worn camera is switched from the privacy mode to the menu mode, the body-worn camera can return to the privacy mode by the operation of the turntable 3.

Figure 9:
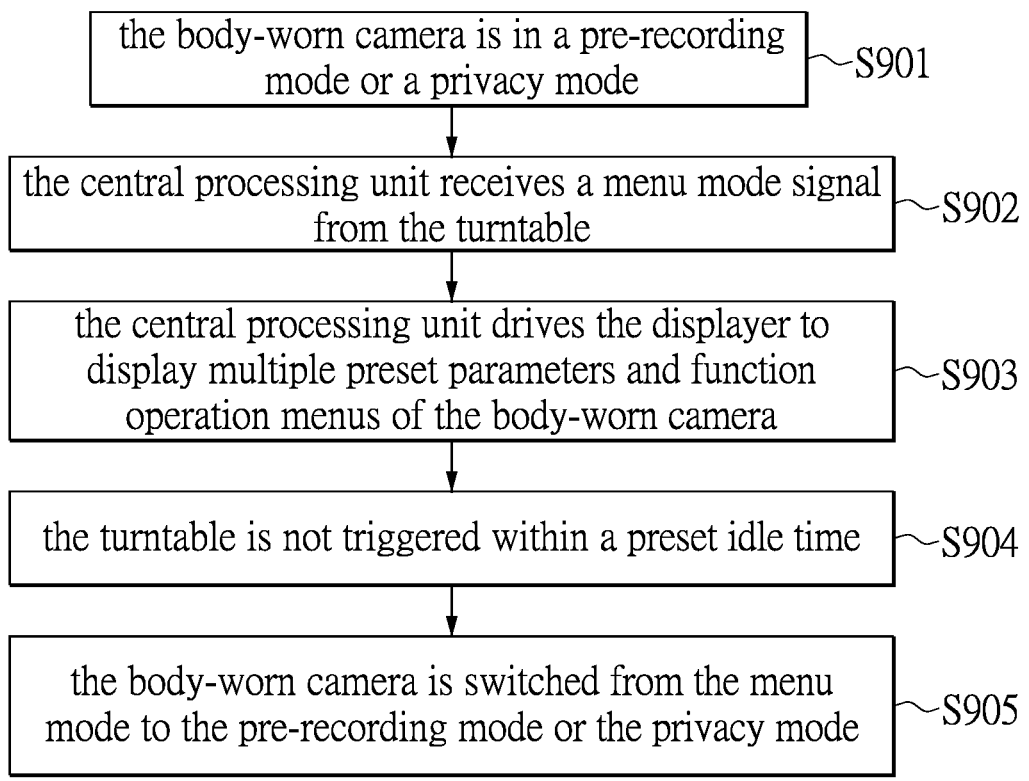
FIG. 9 is a flowchart of the operation method of the body-worn camera according to a fifth embodiment of the present disclosure.

FIG. 9 is a flowchart of the operation method of the body-worn camera according to a fifth embodiment of the present disclosure. Referring to FIG. 9, in step S901, the body-worn camera is in a pre-recording mode or a privacy mode. In step S902, the central processing unit 7 receives a menu mode signal from the turntable 3. At this time, the body-worn camera is switched from the pre-recording mode or the privacy mode to the menu mode.

In step S903, the central processing unit 7 drives the displayer 4 to display multiple preset parameters and function operation menus of the body-worn camera.

In step S904, the turntable 3 is not triggered within a preset idle time.

In step S905, the body-worn camera is switched from the menu mode to the pre-recording mode or the privacy mode.

For example, a default idle time is ten seconds. if the turntable 3 is not rotated within ten seconds after the body-worn camera is in the menu mode, the body-worn camera is switched from the menu mode to the pre-recording mode or the privacy mode. Furthermore, each time when the turntable 3 is rotated each time, the idle time is restarted.

In addition, when the central processing unit 7 of the body-worn camera receives the recording trigger signal, the body-worn camera that is in the pre-recording mode, the privacy mode, or the menu mode enters the video recording mode.

Beneficial Effects of the Embodiments

In conclusion, in the body-worn camera and the operation method thereof provided by the present disclosure, when a police officer finishes using the body-worn camera to record a video relevant to a scene of accident, the police officer may immediately use the body-worn camera to save the corresponding relationship between a category name and the video. In this way, when the police officer returns to a police station after completing his duty, the police officer does not need to spend time using a server to tag the category name for the video, which saves a lot of time and improves efficiency for an on-duty police officer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A body-worn camera, comprising:
a central processing unit;
a video recording module electrically connected to the central processing unit;
a turntable electrically connected to the central processing unit; and
a main button electrically connected to the central processing unit;
wherein, after the video recording module completes recording a video, when the central processing unit receives a category mode signal from the turntable and receives a category name confirmation signal from the main button, the central processing unit executes a video tagging program, and the video tagging program saves a corresponding relationship between a category name and the video.

2. The body-worn camera according to claim 1, wherein, when the turntable is rotated by a first angle, the central processing unit receives the category mode signal, and the category name is a first category name; wherein, when the turntable is rotated by a second angle, the central processing unit receives the category mode signal, and the category name is a second category name; wherein the first angle is different from the second angle, and the first category name is different from the second category name.

3. The body-worn camera according to claim 1, wherein, when the body-worn camera is in a pre-recording mode or a privacy mode and the central processing unit receives a menu mode signal from the turntable, the body-worn camera switches from the pre-recording mode or the privacy mode to a menu mode.

4. The body-worn camera according to claim 1, further comprising a displayer, wherein the displayer is electrically connected to the central processing unit; wherein, when the central processing unit receives the category mode signal from the turntable, the display displays the category name; wherein, when the display displays the category name and the main button is not triggered, the central processing unit executes the video tagging program, and the video tagging program saves a corresponding relationship between an uncategorized name and the video.

5. The body-worn camera according to claim 4, further comprising a speaker, a vibrator, and a light-emitting element, wherein the speaker, the vibrator and the light-emitting element are electrically connected to the central processing unit, and wherein, when the displayer displays the category name, the speaker outputs a prompt sound, the vibrator generates vibration, or the light-emitting element emits light.

6. An operation method of a body-worn camera, comprising:
receiving a video recording trigger signal to instruct a video recording module of the body-worn camera to start recording a video;
receiving a stop recording signal to instruct the video recording module to stop recording and to complete recording the video;
receiving a category mode signal from a turntable of the body-worn camera;
receiving a category name confirmation signal from a main button of the body-worn camera; and
executing a video tagging program of the body-worn camera, so as to save a corresponding relationship between a category name and the video.

7. The operation method according to claim 6, further comprising: driving a displayer of the body-worn camera to display the category name, wherein, when the displayer displays the category name and the main button is not triggered, a central processing unit executes the video tagging program so as to save a corresponding relationship between an uncategorized name and the video.

8. The operation method according to claim 7, further comprising: switching the body-worn camera from the category mode to a pre-recording mode after the video tagging program saves the corresponding relationship between the uncategorized name and the video.

9. The operation method according to claim 6, wherein, when the body-worn camera is in a pre-recording mode or a privacy mode and a central processing unit receives a menu mode signal from the turntable, the body-worn camera switches from the pre-recording mode or the privacy mode to a menu mode.

10. The operation method according to claim 9, wherein, when the body-worn camera is in the pre-recording mode, the privacy mode, or the menu mode, and the central processing unit receives the video recording trigger signal, the body-worn camera enters a video recording mode.

* * * * *